Patented Oct. 24, 1950

2,527,120

UNITED STATES PATENT OFFICE 2,527,120

METHOD FOR THE PREPARATION OF BUTADIENE

Léon Charles Denivelle, Paris, France, assignor of one-half to Manufactures de Produits Chimiques Du Nord Etablissements Kuhlmann, Paris, France, a corporation of France No Drawing. Application July 11, 1947, Serial No. 760,515. In France June 3, 1939

7 Claims. (Cl. 260—681)

The present invention relates to a vapor-phase process for producing butadiene-1,3 from butanediol-2,3 or chloro-2-butanol-3.

It has been found, according to the present invention, that butadiene-1,3 in a very pure state is obtained with excellent yields by submitting to a heating at high temperatures, preferably in the presence of a catalyser, a mixture of vapours containing butanediol-2,3 or chloro-2-butanol-3 and acetic acid or anhydride.

A method is already known for the preparation of butadiene which consists in bringing esters of butanediol-2,3 to a high temperature with monocarboxylic acids. The method according to this invention makes it possible to obtain butadiene without passing through said esters, which constitutes great progress, especially in consideration of the known methods used for the manufacture of the latter.

The butanediol-2,3 used for carrying out the method according to the invention can be a pure or technical product obtained through fermentation or through synthesis. The chloro-2-butanol-3 which can also be used as starting material is obtained preferably through the action of hydrochloric gas on the butanediol-2,3.

The mixture of vapours which, according to the invention, is brought to a high temperature can be diluted by means of inert vapours or gases such as nitrogen, carbonic gas, hydrocarbon vapours. The temperatures which are particularly favorable to the formation of butadiene fall between 350 and 600° C., but the said limits could be exceeded without departing from the scope and spirit of the invention. The formation of butadiene is facilitated by the presence of certain catalysts such as the dehydration catalysts and bodies possessing a large active surface: silica gel, kaolin, colloidal clays, active carbon and other similar substances.

The reaction can be effected by passage of the vapours through heated tubes containing the catalytic mass in one part of their length or through any other device used for pyrogenation or catalytic reactions.

The following examples are non-limitative examples:

*Example 1.*—A mixture of 100 parts of butylenglycol-2,3 and 125 parts of acetic anhydride are passed, at the rate of 125 grams of liquid per hour, through a pyrex glass tube of 3 centimetres diameter and 60 centimetres length filled with kaolin in two thirds of its length and brought to a temperature of 550° C. The products leaving the reaction tube enter a water cooler which condenses the glycol which has not been converted as well as pyrogenation products of low volatility such as acetic acid. The remaining gases are washed in a diluted lye and liquefied in a vessel cooled with carbonic snow.

Very pure butadiene is thus isolated.

*Example 2.*—A mixture of 90 parts of butylenglycol-2,3 and 140 parts of glacial acetic acid are passed, at the rate of 100 grams of liquid per hour, through a pyrex glass tube of 3 centimetres diameter and 60 centimetres length filled with silica gel in two thirds of its length and brought to a temperature of 580° C. The reaction products are submitted to the same treatment as in Example 1.

Very pure butadiene is isolated.

*Example 3.*—A mixture of 110 parts of chloro-2-butanol-3 and 65 parts of acetic anhydride are passed, at the rate of 90 grams of liquid per hour, through a pyrex glass tube of 3 centimetres diameter and 60 centimetres length filled in two thirds of its length with a mixture of colloidal clay and active carbon and brought to a temperature of 500° C. The reaction products are submitted to the treatment described in Example 1. The butadiene which has formed is collected in a vessel cooled with carbonic snow.

What I claim is:

1. A vapor-phase method of producing butadiene-1,3 comprising vaporizing a hydroxybutane selected from the group consisting of butanediol-2,3 and chloro-2-butanol-3 and an acetic acid substance selected from the group consisting of acetic acid and acetic acid anhydride, and heating a mixture of the resulting vapors to form the butadiene-1,3.

2. A vapor-phase method of producing butadiene-1,3 comprising vaporizing a hydroxybutane selected from the group consisting of butanediol-2,3 and chloro-2-butanol-3 and an acetic acid substance selected from the group consisting of acetic acid and acetic acid anhydride, and heating a mixture of the resulting vapors in the presence of a dehydration catalyst to form the butadiene-1,3.

3. A vapor-phase method of producing butadiene-1,3 comprising vaporizing a hydroxybutane selected from the group consisting of butanediol-2,3 and chloro-2-butanol-3 and an acetic acid substance selected from the group consisting of acetic acid and acetic acid anhydride, heating a mixture of the resulting vapors at a temperature of the order of 350° to 600° C. in the presence of a dehydration catalyst to form the butadiene-1,3, cooling the resulting vapors to separate products having lower volatility than the butadiene, and further cooling the remaining vapors to separate the butadiene.

4. A vapor-phase process for producing butadiene-1,3 comprising vaporizing butanediol-2,3 and an acetic acid substance selected from the group consisting of acetic acid and acetic acid anhydride, and heating a mixture of the resulting vapors at a temperature of the order of 350° to 600° C. in the presence of a dehydration catalyst to form the butadiene-1,3.

5. A vapor-phase process for producing butadiene-1,3 comprising heating a mixture of the vapors of butanediol-2,3 and acetic acid anhydride at a temperature of the order of 350° to 600° C. in the presence of a dehydration catalyst to form the butadiene-1,3, passing the resulting vapors through a cooling medium to condense products of lower volatility than the butadiene-1,3, and further cooling the vapors to liquefy the butadiene.

6. A vapor-phase process for producing butadiene-1,3 comprising heating a mixture of the vapors of butanediol-2,3 and glacial acetic acid at a temperature of the order of 350° to 600° C. in the presence of a dehydration catalyst to form the butadiene-1,3, passing the resulting vapors through a cooling medium to condense products of lower volatility than the butadiene-1,3, and further cooling the vapors to liquefy the butadiene.

7. A vapor-phase process for producing butadiene-1,3 comprising heating a mixture of the vapors of chloro-2-butanol-3 and acetic acid anhydride at a temperature of the order of 350° to 600° C. in the presence of a dehydration catalyst to form the butadiene-1,3, passing the resulting vapors through a cooling medium to condense products of lower volatility than the butadiene-1,3, and further cooling the vapors to liquefy the butadiene.

LÉON CHARLES DENIVELLE.

REFERENCES CITED

The following references are of record in the file of this patent:

UNITED STATES PATENTS

| Number | Name | Date |
| --- | --- | --- |
| 1,002,400 | Hofmann et al. | Sept. 5, 1911 |
| 1,682,919 | Maximoff | Sept. 4, 1928 |
| 2,345,113 | Guggemos et al. | Mar. 28, 1944 |
| 2,399,049 | Manninen | Apr. 23, 1946 |
| 2,419,030 | Otto et al. | Apr. 15, 1947 |